(12) United States Patent
Stichweh

(10) Patent No.: US 8,350,517 B2
(45) Date of Patent: Jan. 8, 2013

(54) APPLYING A CONTROL UNIT TO AN ASYNCHRONOUS MACHINE WHICH IS OPERATED WITHOUT A ROTARY ENCODER

(75) Inventor: Heiko Stichweh, Springe (DE)

(73) Assignee: Lenze Drives GmbH, Extertal (DE)

( * ) Notice: Subject to any disclaimer, the term of this patent is extended or adjusted under 35 U.S.C. 154(b) by 304 days.

(21) Appl. No.: 12/746,029

(22) PCT Filed: Dec. 4, 2008

(86) PCT No.: PCT/EP2008/066832
§ 371 (c)(1),
(2), (4) Date: Sep. 7, 2010

(87) PCT Pub. No.: WO2009/071642
PCT Pub. Date: Jun. 11, 2009

(65) Prior Publication Data
US 2010/0327798 A1    Dec. 30, 2010

(30) Foreign Application Priority Data

Dec. 4, 2007  (DE) .......................... 10 2007 058 209

(51) Int. Cl.
*H02P 21/12* (2006.01)
*H02P 27/06* (2006.01)

(52) U.S. Cl. ....................................... 318/809; 318/812
(58) Field of Classification Search .................. 318/729, 318/807–809, 812
See application file for complete search history.

(56) References Cited

U.S. PATENT DOCUMENTS 4,338,559 A * 7/1982 Blaschke et al. .............. 318/805
(Continued)

FOREIGN PATENT DOCUMENTS

DE       3 543 983 A1    6/1987
(Continued)

OTHER PUBLICATIONS

Adjustment of Frequency Inverters, Witt & Sohn, 6 pages, [known prior to the priority date].
(Continued)

*Primary Examiner* — Bentsu Ro
(74) *Attorney, Agent, or Firm* — Hunton & Williams LLP

(57) ABSTRACT

Exemplary embodiments provide a method for connection or application of a converter to a rotating asynchronous machine which is operated without an encoder, without a high current and without a torque surge. The method provides a control unit, using an inverter or converter, for feeding the asynchronous machine which rotates at a mechanical rotary speed. The asynchronous machine is regulated by the control unit. A stator current vector is ascertained from measured currents of the stator windings of the asynchronous machine and a rotating stator voltage vector. Calculation is effected in respect of a stator flux change vector from the stator current vector, the stator voltage vector and a stator resistance in accordance with a motor model. An angle difference between the stator current vector and the stator flux change vector is calculated. That angle difference is regulated to a reference value of 90° or −90°, wherein an output signal of the regulator corresponds to a rotary field frequency, to be impressed, of the voltage vector of the stator. Regulation is effected in respect of an amplitude of the stator voltage vector by way of a current regulator to which the difference of a current reference value and a parameter corresponding to the amplitude of the stator current is made available at the input as a regulating difference.

29 Claims, 10 Drawing Sheets

U.S. PATENT DOCUMENTS

| | | | |
|---|---|---|---|
| 4,839,589 A | | 6/1989 | Heinle |
| 5,272,429 A | * | 12/1993 | Lipo et al. .................... 318/808 |
| 5,610,485 A | * | 3/1997 | Depenbrock et al. ......... 318/432 |
| 5,654,624 A | | 8/1997 | Schroderus |
| 6,008,618 A | * | 12/1999 | Bose et al. .................... 318/811 |
| 7,034,510 B2 | | 4/2006 | Heikkila et al. |

FOREIGN PATENT DOCUMENTS

| | | |
|---|---|---|
| DE | 4 107 362 A1 | 9/1992 |
| DE | 19 503 658 A1 | 8/1996 |
| DE | 199 19 752 C1 | 1/2001 |
| DE | 10 213 563 C1 | 9/2003 |
| EP | 469 177 A1 | 5/1992 |
| JP | 02032788 A | 2/1990 |
| JP | 2000-197397 | 7/2000 |
| JP | 2002-369597 | 12/2002 |
| WO | WO 02/103889 | 12/2002 |

OTHER PUBLICATIONS

Luomi, "Transient Phenomena in Electrical Machines," 6 pages (1998).

"Control of Electrical Drives," $2^{nd}$ Edition, ABB, Jul. 22, 1997.

Heinrich Frohne et al., Moeller Electrical Engineering, Chapter 5, Einfacher Sinusstromkres ED 6 pages (1992)1.

A. David, et al. IEEEXplore, "Maintaining the synchronism of an AC Adjustable speed drives during short supply interruptions for an optimal and automatic soft restart" (1993).

International Search Report for International Application No. PCT/EP2008/066832 mailed Oct. 1, 2009.

* cited by examiner

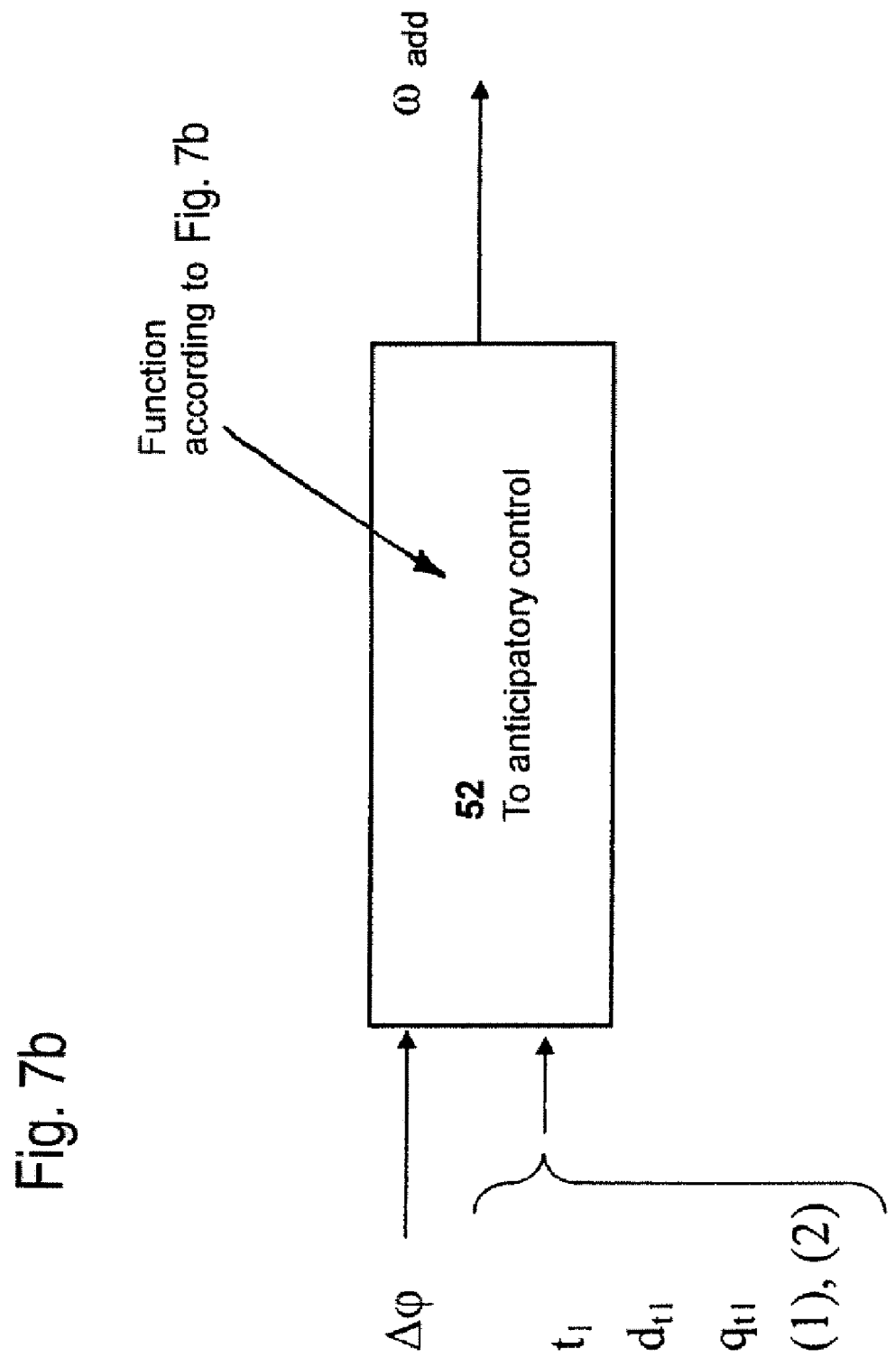

APPLYING A CONTROL UNIT TO AN ASYNCHRONOUS MACHINE WHICH IS OPERATED WITHOUT A ROTARY ENCODER

CROSS-REFERENCE TO RELATED APPLICATIONS

This application is the U.S. National Stage filing of International Application No. PCT/EP2008/66832, filed Dec. 4, 2008, which claims priority to German Patent Application No. 10 2007 058 209.0, filed Dec. 4, 2007, the disclosures of which are hereby incorporated by reference.

FIELD OF THE INVENTION

The method of this invention relates to connecting or applying an inverter or converter (as a control unit) to a stationary or rotating asynchronous machine. In general terms the control unit is not synchronised with the machine. The method may be used for asynchronous machines in which the rotary speed is not fed back to the inverter or converter (encoder-less mode of operation) so that at the time of connection or application, there is no information about the currently prevailing mechanical rotary speed (as the actual speed) of the asynchronous machine.

BACKGROUND

The control unit connects to and synchronises with the rotating or stationary asynchronous machine (ASM or DAM).

The procedure of identification of the mechanical rotary speed or the synchronous rotary field frequency in an asynchronous machine operated without an encoder is referred to in the literature as the 'capture mode'. An associated circuit which permits such connection while avoiding current and torque peaks bears the technical name 'capture circuit'.

The capture circuit is used in applications in which, for example, due to major mass moments of inertia of the drive, it is not possible to exclude the converter being connected to a drive which is still spinning. Further fields of use are found in the area of fan technology where at the time of connection the current rotary speed of the drive is not known and also cannot be measured for economic reasons.

Connecting a converter to a rotating asynchronous machine results in a high current and a torque surge which should be avoided, in dependence on residual remanence, slip and impressed voltage.

Methods of starting asynchronous machines in a situation with a stationary or rotating is rotor are known from various patent literature. For example, DE 38 20 125 C2 presents such a method. The method presented is for starting an inverter-fed encoder-less asynchronous motor which permits capture of a rotating drive without a residual flux being present in the machine. The method is based on an equivalent-circuit diagram, held in rotor field co-ordinates, of the ASM, in which the slip frequency is reconstructed from a measurement of the terminal current. The synchronous rotary frequency for the control voltage is ascertained from the calculated or estimated slip frequency and the impressed stator frequency. The change in time of the torque-forming current component is in that case added as a dynamic correction value to the motor frequency. The method converges in the synchronous rotary frequency of the drive and in that way permits identification of the synchronous speed.

DE 195 32 477 A1 describes a method for starting an encoder-less asynchronous machine which functions both with and also without a residual flux in the ASM uses zeroing of the torque formed. In that method the stator current vector is measured and a stator flux vector generated by the voltage is estimated or determined. From those values the moment caused at the motor is calculated and regulated to zero by means of a regulator. The system experiences excitation by a current pulse, from which it follows that upon possible rotation of the machine a torque is formed, which can be regulated as desired by the regulating system.

An essential feature of the last two methods mentioned is that a torque which is regulated to zero with a regulating system is calculated from the impressed voltage and the measured current. As a departure from that approach, DE 195 03 658 A1 presents a method which uses the residual remanence of the rotor flux and the voltage induced in the stator winding. When no residual rotor flux is present the method can also be used by excitation being effected with a voltage pulse.

An estimated value for the mechanical rotary field frequency of the rotor is derived from the rotary field frequency of the induced voltage vector which is ascertained by way of differentiation of the angle of the voltage vector measured at different times.

EP 469 177 A1 describes a method which also determines the rotary speed of an asynchronous motor, utilising the remanence effect. Evaluation of the terminal voltage induced by the remanence of the rotor has to be effected in that case by an additional circuit arrangement for voltage measurement as during the measurement operation no voltage is impressed by the converter and the final stage is blocked.

The method of DE 35 43 941 A1 uses the residual remanence of the system in a similar way. On the basis of the measured induced voltage, a rectangular signal of the same phase and frequency is generated, which is used for identification of the mechanical rotary speed or the synchronous rotary field frequency.

DE 35 43 983 A1 presents a method which is suitable for connecting a converter to a non-excited rotary machine which is still rotating. That method involves a search method which involves passing through the rotary frequency range with a constant reference current $I_S$. On the basis of the change in the voltage to be impressed for that purpose (dU/dt) the search speed is adapted and reduced for major voltage changes. The mechanical rotary speed is detected on the basis of the increase in the flux in the region of the synchronous operating point. A disadvantage with that search method is the time required for identification of the mechanical rotary speed and the impressed torque which occurs because of the magnetisation effect.

DE 199 19 752 C1 describes a method which unlike the foregoing methods dispenses with calculation of the torque, the rotor flux or the moment or magnetisation current. In addition that method does not require any rotor residual remanence. In this method the reference value for the stator current vector is determined directly from the stator flux vector, wherein the direction of the current vector is selected substantially parallel to the direction of the flux vector. The method permits the use of the current regulator structures which exist in many cases (field-oriented regulation) and can be incorporated at minimum complication and expenditure. It only presupposes an expansion for calculation of the stator flux vector, which is determined by means of the impressed voltage and the measured current.

SUMMARY OF THE PREFERRED EMBODIMENTS

The object of the present invention is to provide for connection of a control unit to an asynchronous machine without a high current and without a torque surge and not to overload the mechanical and controlling system. The method is to be operable independently of the residual remanence and is to be used in relation to asynchronous machines operated without an encoder.

Exemplary embodiments proposed herein permit the connection of the control unit as an inverter or converter to the rotating or stationary—encoder-less—asynchronous machine without calculation of the torque, the rotor or stator flux, mechanical slip or the is magnetisation current of the machine being required for that purpose. The lack of encoder (encoder-less) concerns rotary speed encoders which are not present, or corresponding sensors.

The control unit (or its control device) ascertains the synchronous rotary field frequency and is synchronised to the rotating or stationary asynchronous machine. Unnecessary current and torque peaks are avoided during connection.

The method does not presuppose any residual remanence or any residual rotor flux and functions both in relation to drives with and without a residual rotor flux. There is no need for additional hardware, for example, for detecting terminal voltages of the control unit. Nonetheless the remanence of the machine can advantageously be used.

Due to the small (low) current which is impressed (to be impressed) which is used according to the embodiments minimal to no torque is built up at the mechanical shaft of the asynchronous machine. The asynchronous machine is neither noticeably accelerated or decelerated by the method according to the invention, nor exposed to jerky torque surges. Rather, the occurrence of unwanted current peaks can be avoided by way of a current regulator.

BRIEF DESCRIPTION OF THE DRAWINGS

The invention is explained and supplemented by reference to embodiments by way of example, in which respect it is pointed out that the following representation involves the description of preferred examples of the invention.

FIG. 7b is a function 52 of remanence evaluation for an anticipatory control in FIG. 8.

FIG. 7c is a representation of the function from FIG. 7a.

DETAILED DESCRIPTION OF THE PREFERRED EMBODIMENTS

Figure 1:
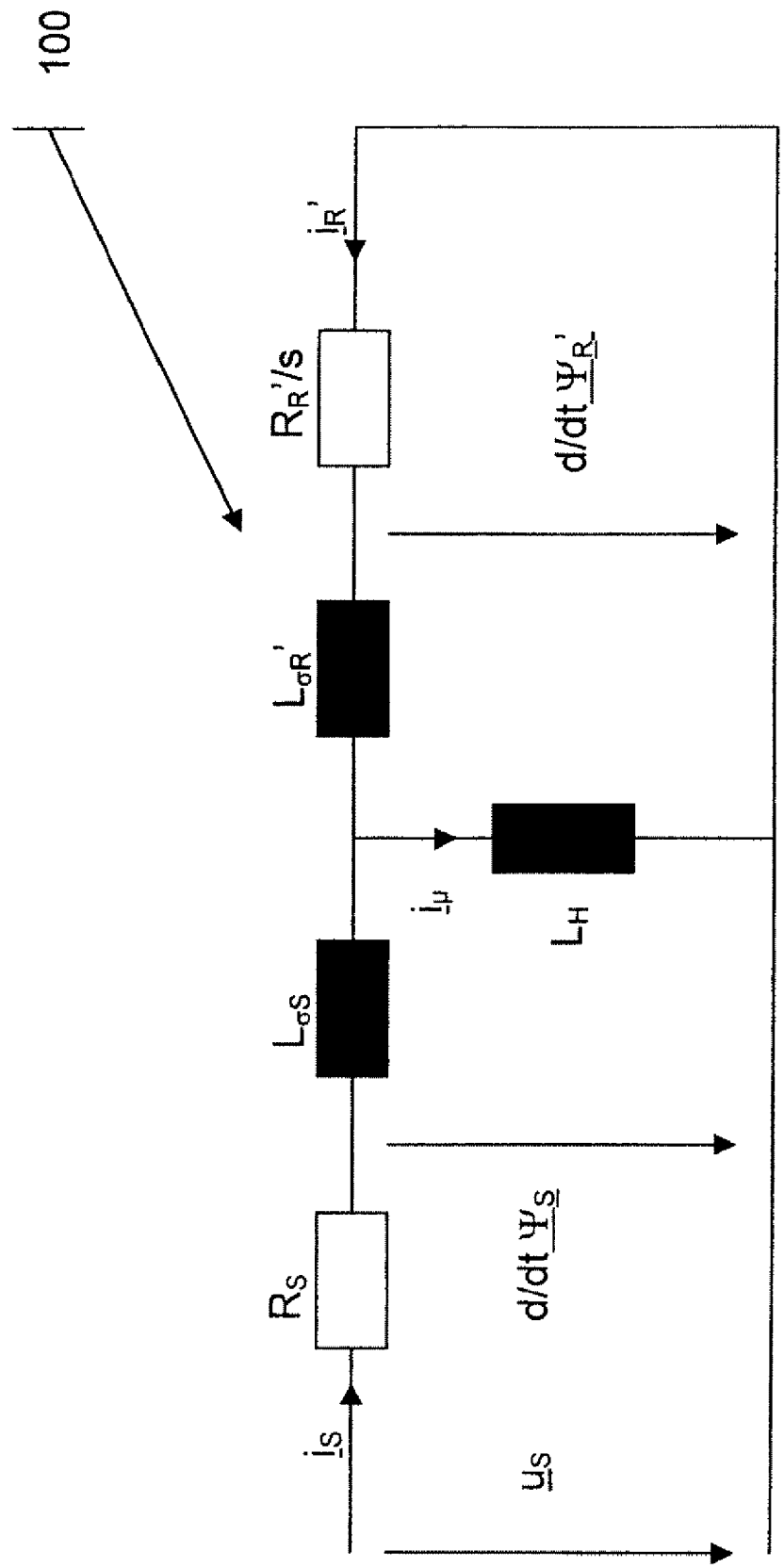
FIG. 1 is an exemplary equivalent-circuit diagram 100 of an asynchronous machine.
Figure 2:
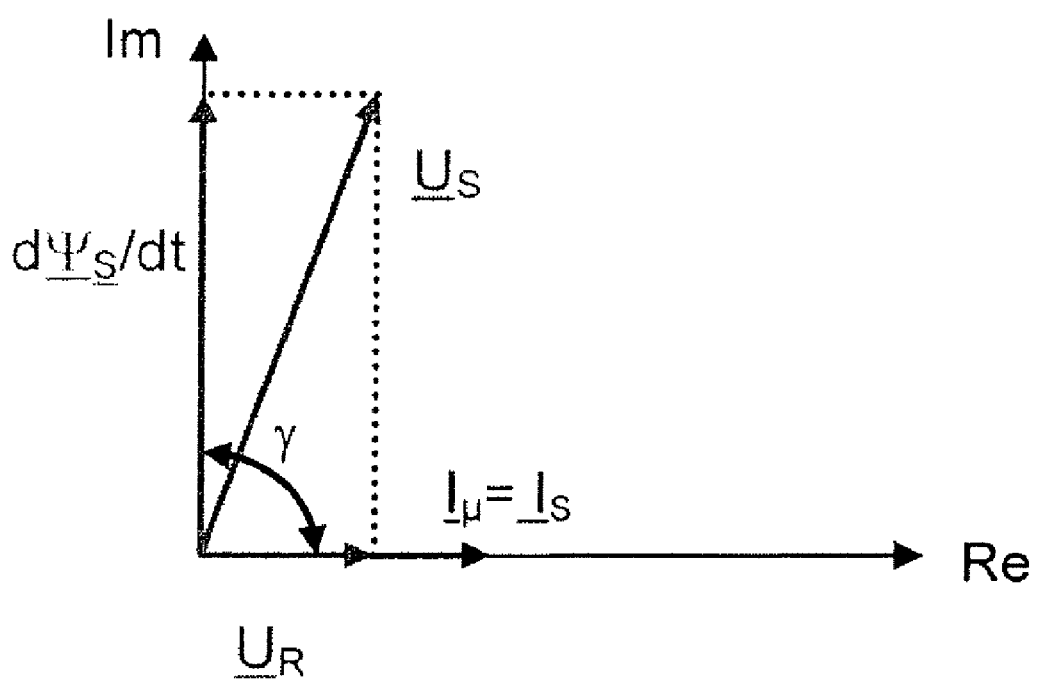
FIG. 2 shows a vector diagram of the current, voltage and flux change space vectors for the synchronous point (s=0)

Hereinafter firstly the physical effect which forms the basis for exemplary embodiments will be described. The method uses a model of the machine, for example an equivalent-circuit diagram of the asynchronous machine which is shown in FIG. 1. The aim of the capture method is identification of the synchronous rotary field frequency and connection of the control unit to the asynchronous machine. For the synchronous operating point there is no slip (s is substantially zero). By virtue of the lack of slip at the synchronous point the rotor current space vector $i_{is\,R}$ of a length of zero, see FIG. 2. Consequently the stator current space vector or stator current vector $i_S$ at that operating point is equal to the magnetisation current vector $i_\mu$.

The following applies for the stator current vector at the synchronous operating point:

$$i_\mu = i_S \tag{1}$$

The stator flux change vector can be calculated from the impressed stator voltage vector and the measured stator current vector, with knowledge of the stator resistance and possibly a converter or inverter error.

$$\underline{U}_s = R_s i_s + \frac{d}{dt}\Psi_s \tag{2}$$

For the synchronous operating point the stator current vector has a 90° angle relative to the stator flux change vector. The stator flux change vector and the stator current vector are perpendicular to each other.

$$\gamma = \angle\left(i_s, \frac{d}{dt}\Psi_s\right) \tag{3}$$

$$|\gamma_{Synchron}| = \left|\angle\left(i_s, \frac{d}{dt}\Psi_s\right)\right| = \left|\angle\left(i_\mu, \frac{d}{dt}\Psi_s\right)\right| = 90°$$

As a departure from the synchronous point the angle γ with a positive rotary field direction for the motor operation is less than 90° and for the generator operation it is greater than 90°.

Exemplary embodiments thus provide a regulator which regulates off the angle γ with a positive rotary field direction to 90°. Parallel to or together with the angle regulation, the amplitude of the stator current vector is regulated to a current reference value to avoid overcurrents and current peaks.

The stator rotary field frequency in the examples represents a state parameter which can be initialized at the beginning of the method with a start value as a frequency and in fact should be so.

Depending on the respective application involved different frequencies present themselves as the initialisation value (first frequency). For example, the last known (mechanical) actual frequency of the asynchronous machine or a constant start value can be used. Anticipatory control of the frequency ω can also be used, in dependence on a remanence of the asynchronous machine.

The angle signal as the output of the regulator for the angle difference can be influenced by an anticipatory control. In that case preferably the remanence of the machine is additionally used, which rotates with the mechanical rotary frequency and differs from the frequency of the impressed stator voltage vector by the slip frequency. For an anticipatory control the slip frequency can be ascertained in the case of machines with remanence and then applied to the output signal of the regulator for the angle difference.

Ascertaining the rotary component with the slip frequency is possible for example on the basis of a time-variable orientation of the stator flux change vector.

That anticipatory control at least in part determines the output signal of the angle regulator. Preferably that anticipatory control is not only a start value but an influence which is permanently applied.

The time until the attainment of synchronicity between actual mechanical rotary speed and impressed frequency or impressing frequency of the control unit, as an inverter or converter, can be markedly reduced in that way.

Figure 3:
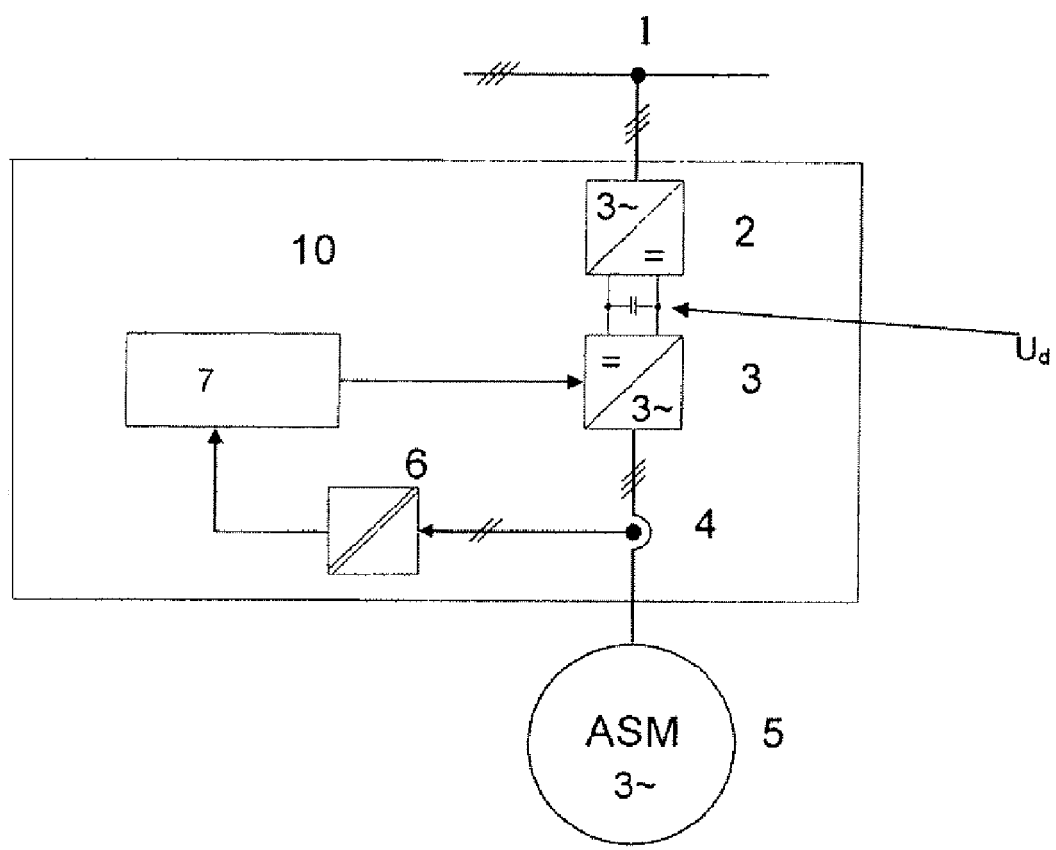
FIG. 3 shows the structure of a control unit as a frequency converter 10 with feeding network, rectifier, inverter, two-phase or three-phase current detection, asynchronous machine 5 and other components.

FIG. 3 shows a view in principle of an apparatus for implementing an example of the method according to exemplary embodiments.

Therein a rectifier 2 rectifies the mains voltage 1 to give a dc voltage $U_d$ which is fed to the inverter or converter 3 as an intermediate circuit voltage. The latter is the power control unit for the asynchronous machine. The asynchronous machine 5 (DAM or ASM) is connected to the output terminals of the inverter. The control unit 10 for the DAM 5 includes a regulating system 7 fed by the current measurement means 4.

Actuation of the power semiconductor switches of the converter or inverter 3 is effected is by way of a control circuit actuated by a regulator. At least two of the three motor phase currents are detected (sensor 4 and coupling 6) and fed to the regulating system 7. The stator current vector is determined within the regulating system from the detected motor currents. The stator voltage vector may be ascertained by measurement technology by way of measurement of the voltage at the output terminals of the inverter 3 or can be reconstructed from the detected intermediate circuit voltage $U_d$ and the switching state of the inverter. For that purpose the intermediate circuit voltage may be detected or estimated, using measurement technology.

Figure 4:
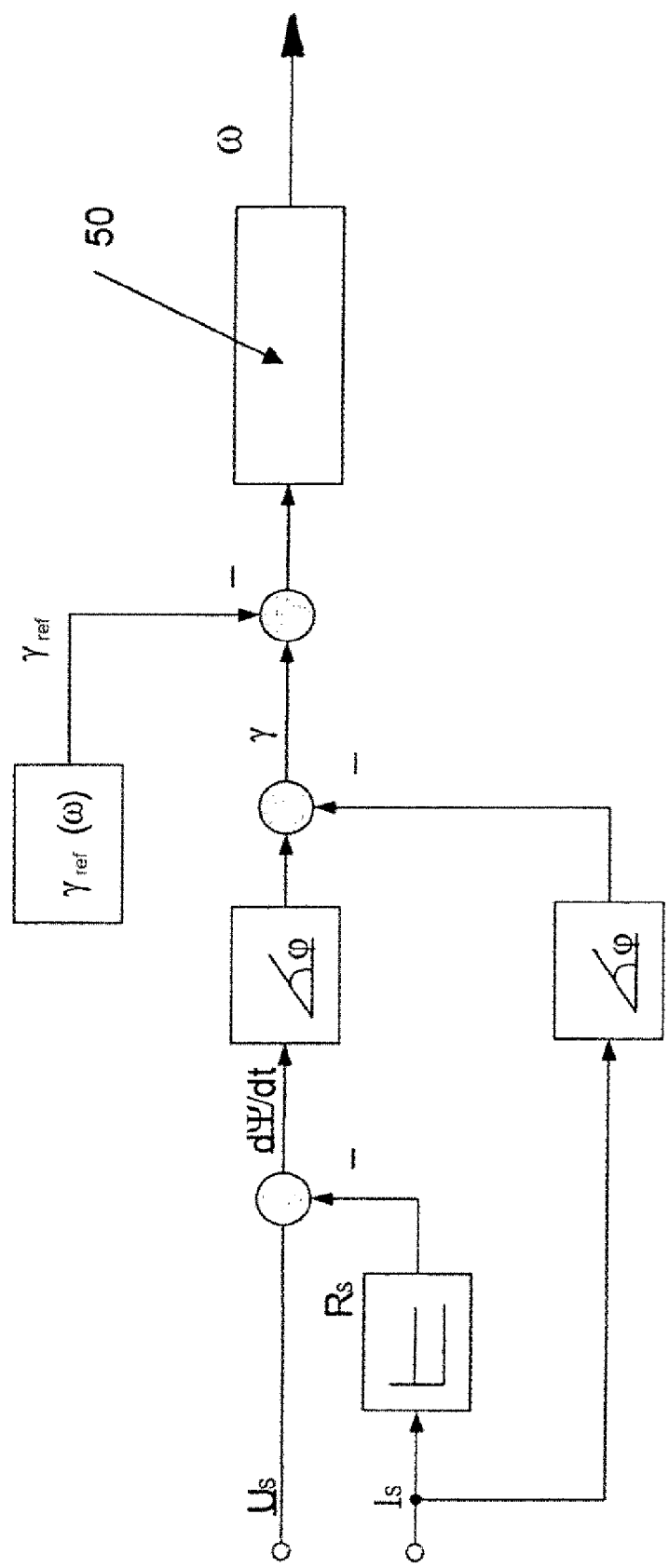
FIG. 4 is a view of a first angle difference regulation with regulator 50 for the capture circuit.

A regulating system 7, by way of example, is shown in FIG. 4.

The stator flux change vector d $\psi_S$/dt is calculated on the basis of equation (2) from the stator voltage vector $u_S$ and the stator current vector $i_s$ and the stator resistance $R_S$. Then the angle γ (gamma) may be ascertained from the angle difference between the stator current vector and the stator flux change vector.

That angle is regulated in a, for example, integrating angle regulator 50 in dependence on the direction of rotation to an angle reference value of 90° with a positive and −90° with a negative direction of rotation of the currently prevailing rotary field frequency.

Hysteresis may be used at the transitional point from 90° to −90° and from −90° to 90° (that is to say at a rotary field frequency near to zero).

The gain of the (integral) angle regulator 50 may in this case be adaptively adapted having regard to the currently prevailing stator frequency for optimisation of the operating characteristic. The output of the angle regulator represents the stator rotary field frequency ω (omega) to be impressed.

Parallel to (or together with) the angle regulator 50 the amplitude of the stator current vector $i_S$ is regulated to a given reference value by way of a current regulator 51. In that case the regulator 51 receives the feed of the regulating difference 51a at the input, being formed from the reference value and the actual value. The reference value can be for example adjusted constantly to a fraction of the magnetization current of the DAM 5 or a fraction of the nominal current of the actuated machine, or may be between 5% and 20% of the nominal current of the converter as the control unit.

Figure 5:
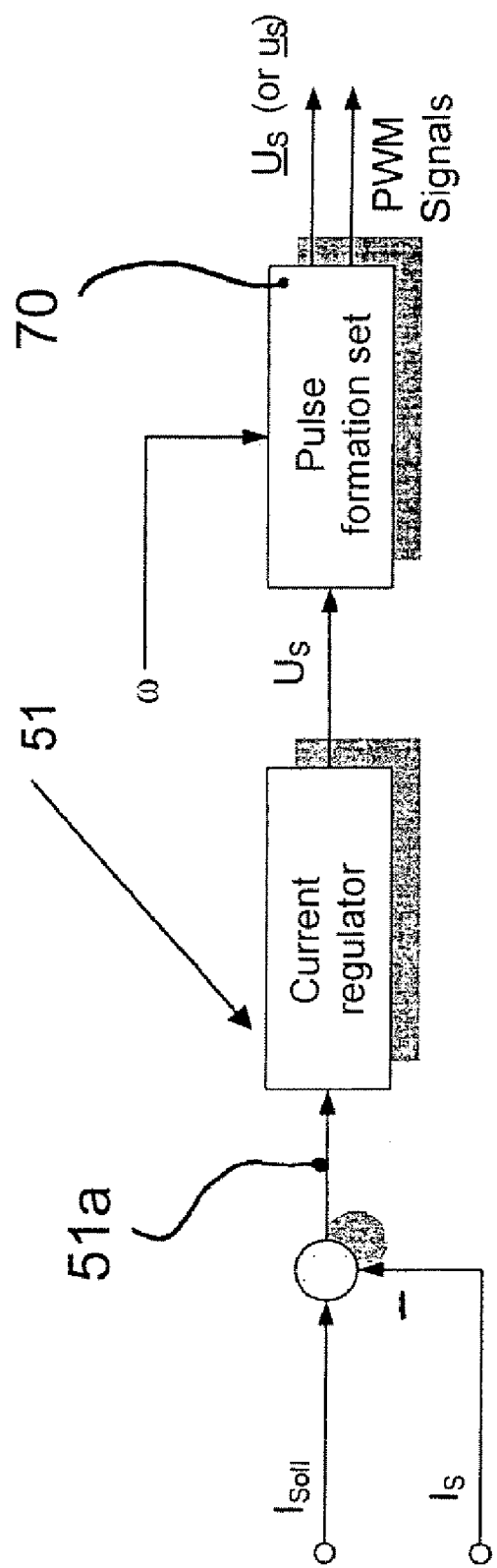
FIG. 5 is current regulation with regulator 51 and the pulse formation set for the control unit.
Figure 6:
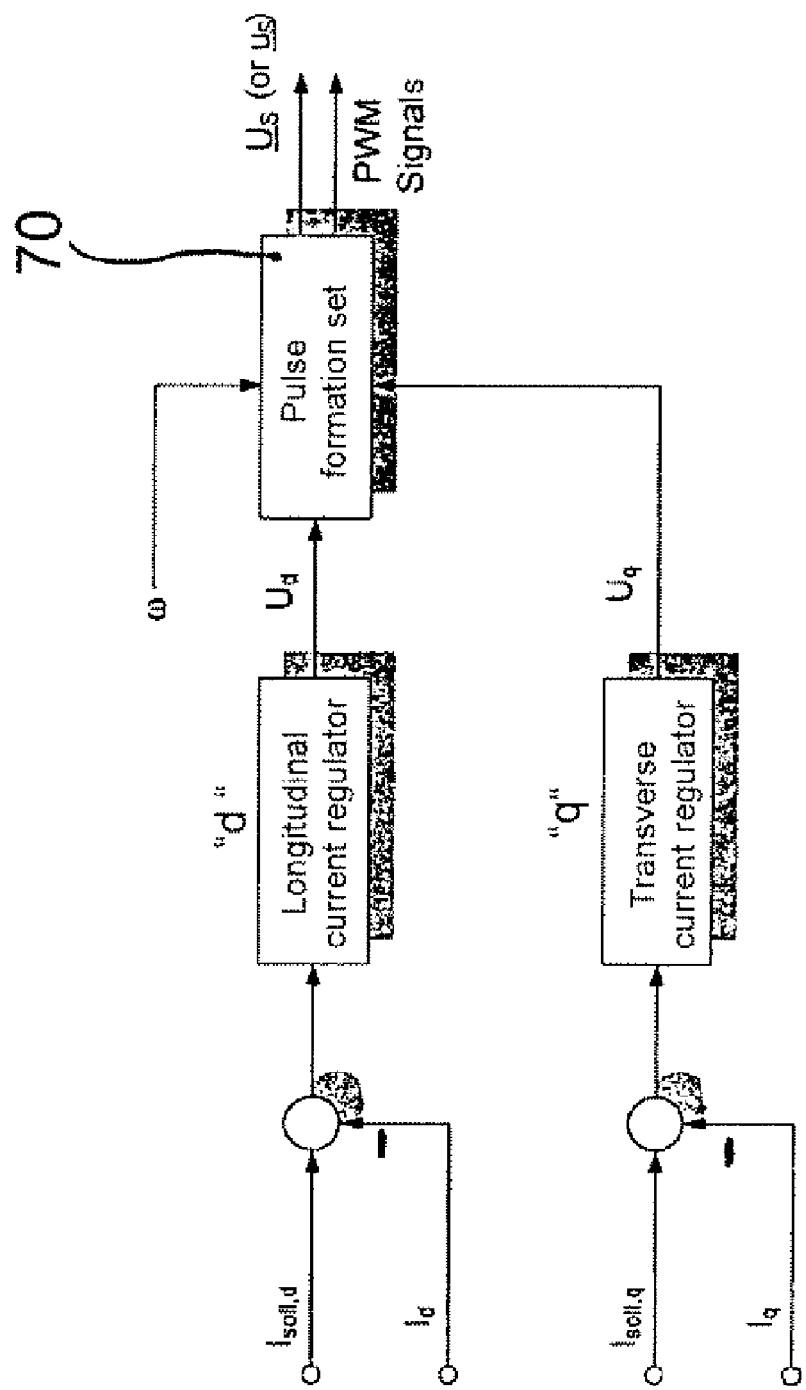
FIG. 6 is a current regulation in the d, q system and a pulse formation set for the control unit.

The current regulator 51 may be designed in known manner, for example, as a simple PI regulator as shown in FIG. 5 or in the form of a parallel d, q PI regulator structure as shown in FIG. 6. It should be appreciated in the latter case that the transverse current reference value of the transverse current regulator 60 should be selected to be zero and the longitudinal current should be regulated to a reference value of greater than zero, preferably between 5% and 20% of the nominal current of the converter 50. Both regulators provide a pulse formation set 70 for the inverter 3 in the converter 10.

In addition transformation to the field-oriented co-ordinate system may involve error during the capture procedure until attainment of the synchronous point as the correct position of the rotor flux is not known during the capture operation. That, however, may have no effect on the capture method and therefore may be disregarded in this example.

In another example, in the period of time during a capture operation, the transverse voltage which is generated by the transverse current regulator 60 and which is proportional to the induced voltage may be used as a further correction signal.

The current regulator ensures that both in the case of a demagnetized and also in the case of an asynchronous machine with residual remanence, active regulation of the current amplitude is effected and unwanted current peaks or overcurrents are prevented.

The current regulator 51 produces at its output an adjusting value for the length of the stator voltage vector, which is adjusted by way of the pulse pattern 70.

The outputs of the angle and current regulator (stator rotary field frequency to be impressed and the length of the stator voltage vector) are transmitted to the pulse formation set 70 which with knowledge of the intermediate circuit voltage ascertains the control signals for the switches of the output end stage.

Pulse formation may be implemented as appreciated by one of skill in the art, for example, in a dual-switch modulation method, a space vector modulation method or a sine-triangle modulation method. To optimize the characteristics, when calculating the degree of modulation, the inverter error characteristic may be taken into consideration.

The stator rotary field frequency in the examples according to exemplary embodiments represent a state parameter which may be initialised and in actuality should be initialised at the beginning of the method with a start value as frequency.

Depending on the respective application different frequencies present themselves as the initialisation value. For example, the last known (mechanical) actual frequency of the asynchronous machine or a constant start value may be used.

Figure 8:
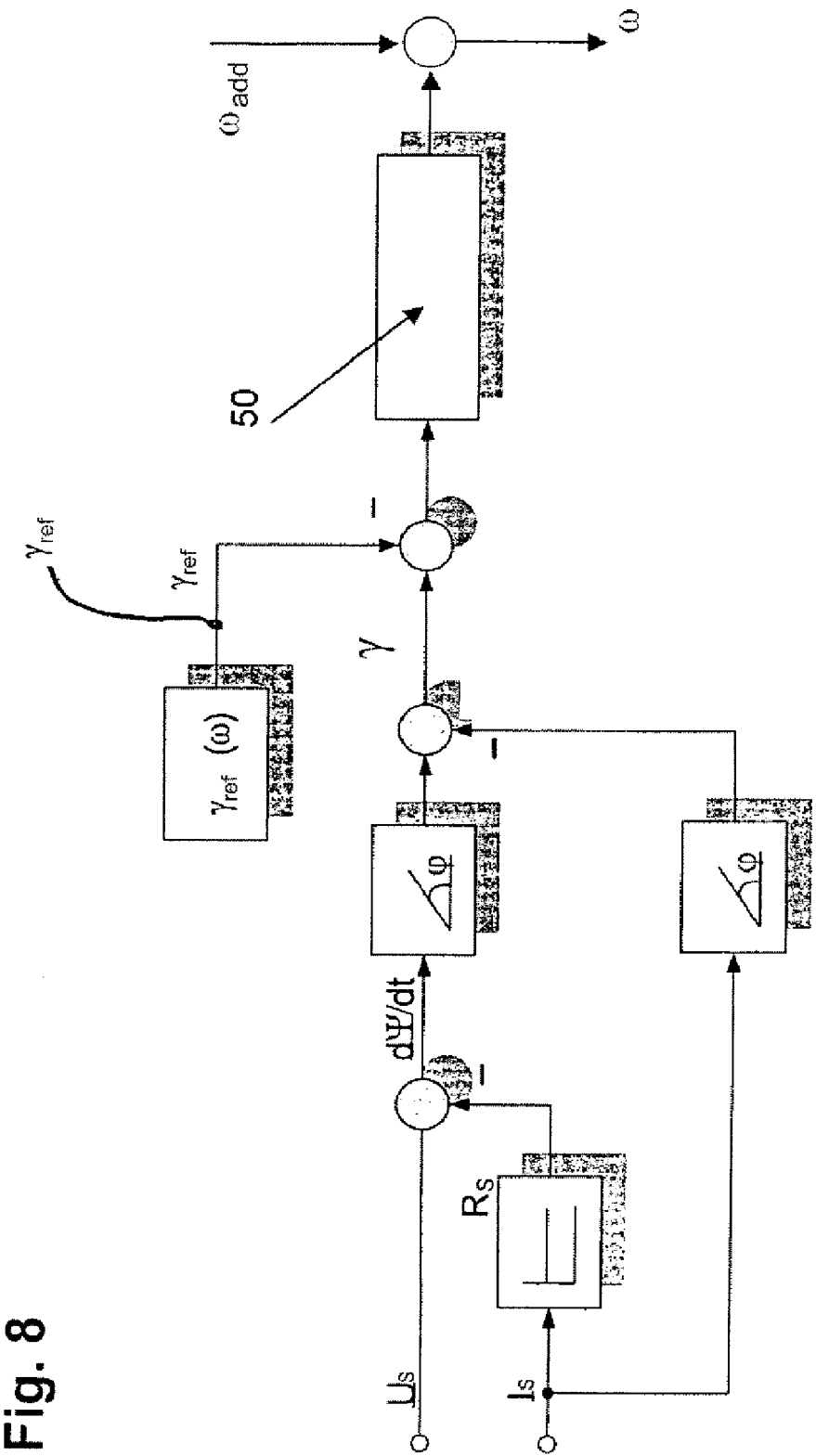
FIG. 8 is a representation of an alternative angle difference regulation with remanence influence of FIGS. 7, 7a and 7b and the regulator 50 from FIG. 4.

In another example, which is directed to FIG. 4' s anticipatory control of the frequency ω, is used, in dependence on a remanence of the machine 5. FIG. 8 shows this example.

Anticipatory control may be used to improve the capture of a spinning machine, for example. That has proven to be beneficial in particular when there are major deviations between the start value of the output regulator 50 in FIG. 4 and the mechanical rotary frequency of the machine to which connection or application is to be effected.

The physical cause of the residual remanence of the asynchronous machine 5 is to be attributed to the orientation of elementary magnets in the rotor. During normal operation of an asynchronous machine the magnetisation current impresses a field which inter alia leads to orientation of elementary magnets in the rotor, Even after the converter has been switched off that orientation can be retained to a limited extent. That results in a residual field strength which is referred to as residual remanence or remaining remanence and which in the case of a rotating asynchronous machine leads to a low induced voltage (from the rotor).

If the capture characteristic is directed to the lowest possible currents, complete re-orientation of the elementary magnets of the rotor, which are still oriented, may not be ensured and the field may not therefore experience magnetic reversal. As a result the residual remanence still has an influence and produces a voltage which occurs as an induced voltage in the system of the model. It appears there as an interference value.

In the case of the low reference currents typical of the capture circuit the field caused by the remanence does not experience magnetic reversal during the capture process so that a voltage component occurs which rotates with the mechanical rotary field frequency and which is represented as an interference parameter to the current regulator.

By virtue of high dynamics of the current regulator that interference parameter can be substantially regulated out, at a constant amplitude in respect of the stator current vector. However that interference parameter leads either to rotation of the output voltage of the current regulator or a change in the difference angle $\gamma$.

Figure 7A:
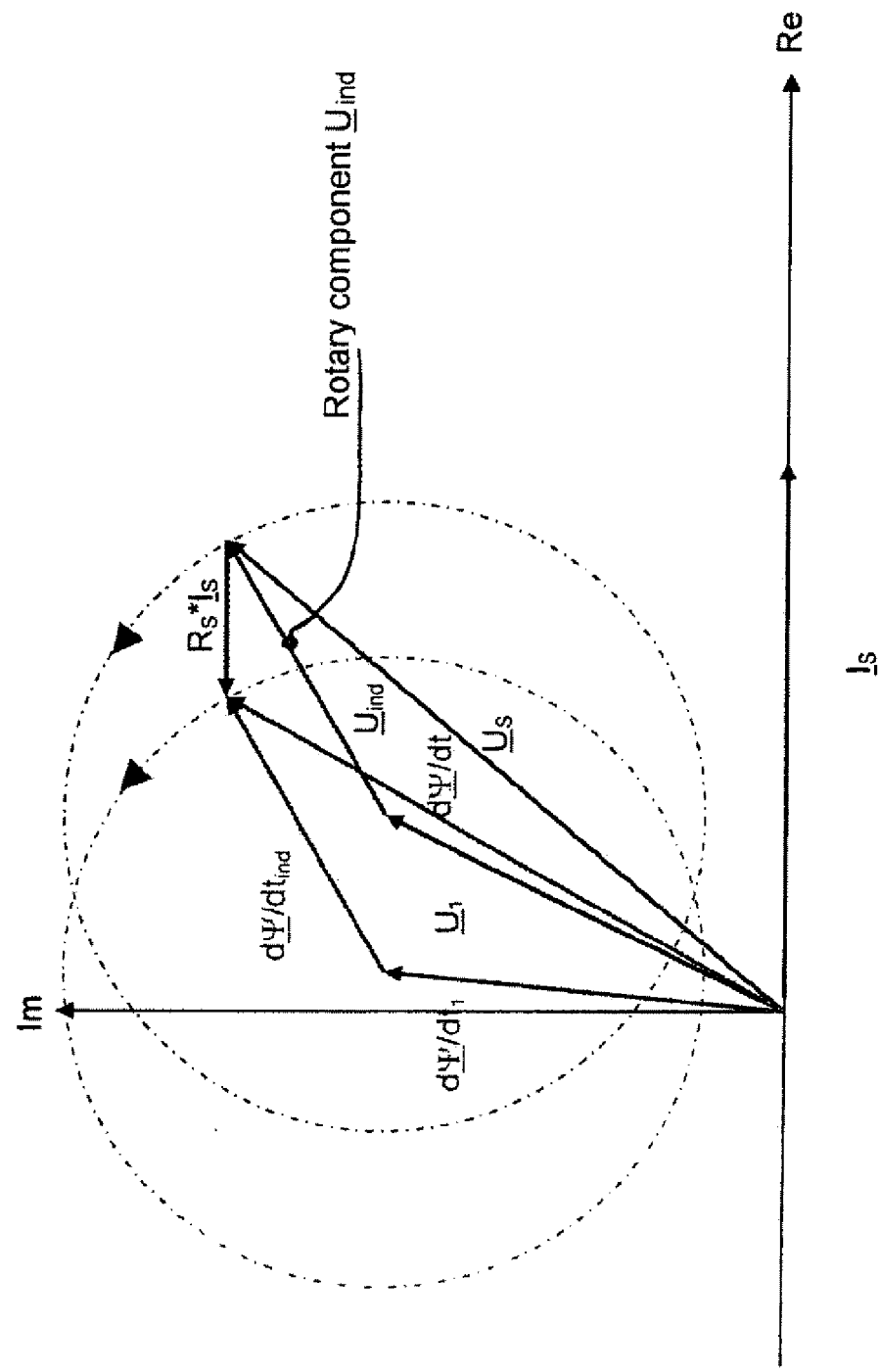
FIG. 7a is a vector diagram showing the remanence evaluation.

A d-q vector representation as shown in FIG. 7a illustrates that physical effect. The voltage component $U_1$ (or as an instantaneous value $u_1$) denotes the stator voltage vector without an interference parameter caused by remanence. The interference caused by residual remanence is compensated with the voltage component $U_{ind}$.

The component $U_{ind}$ rotates therein at the slip frequency of the machine and forms a rotary component. Its frequency is proportional—to the stated extent—to the slip frequency. That may be used by the regulator as an identification or indication of an actual mechanical rotary movement. As the flux change vector is formed directly from the almost constant voltage drop at the ohmic resistance $R_S$ of the stator and from the variable stator voltage vector $\underline{u}_s$, that change vector also has a rotating component as the rotary component.

Here the case of FIG. 7b is to be evaluated as a functional member 52, in respect of as which the induced voltage $U_{ind}$, in comparison with the voltage component $U_1$, is markedly smaller so that the voltage vector does not rotate but the oscillation in the difference angle may be used to ascertain an improved start value in respect of the angle regulator 50, as is shown in FIG. 8 by an anticipatory control $\omega_{add}$.

The slip frequency ascertained by means of the rotating component can be applied as an additive frequency $\omega_{add}$ to the output of the angle difference regulator. The algorithm with which that slip frequency is ascertained is referred to hereinafter as the function for the anticipatory control.

The aforementioned anticipatory control with $\omega_{add}$ may serve as a start value but it can also be used for the entire control, in which case the anticipatory control takes over a part of the regulating deflection and the regulator 50 only has to still compensate for residual deviations. FIG. 8 for that purpose is that circuit in FIG. 4, supplemented by an anticipatory control at the output of the angle regulator, which is influenced by the rotary component and detected by the functional member 52 and as $\omega_{add}$ influences the output value of the regulated angle, and in particular is here additively added.

In a particular configuration a time duration can be used, within which switching-on of the anticipatory control is firstly suspended in order to be switched on after a few milliseconds, for example more than 10 msec to 20 msec. It is possible in that way to avoid mixing of normal transient build-up responses in respect of the current regulator with the transient response by way of the anticipatory control. The beginning of switching on the capture method is proposed as the beginning of the operating duration of the blocking time.

Figure 7C:
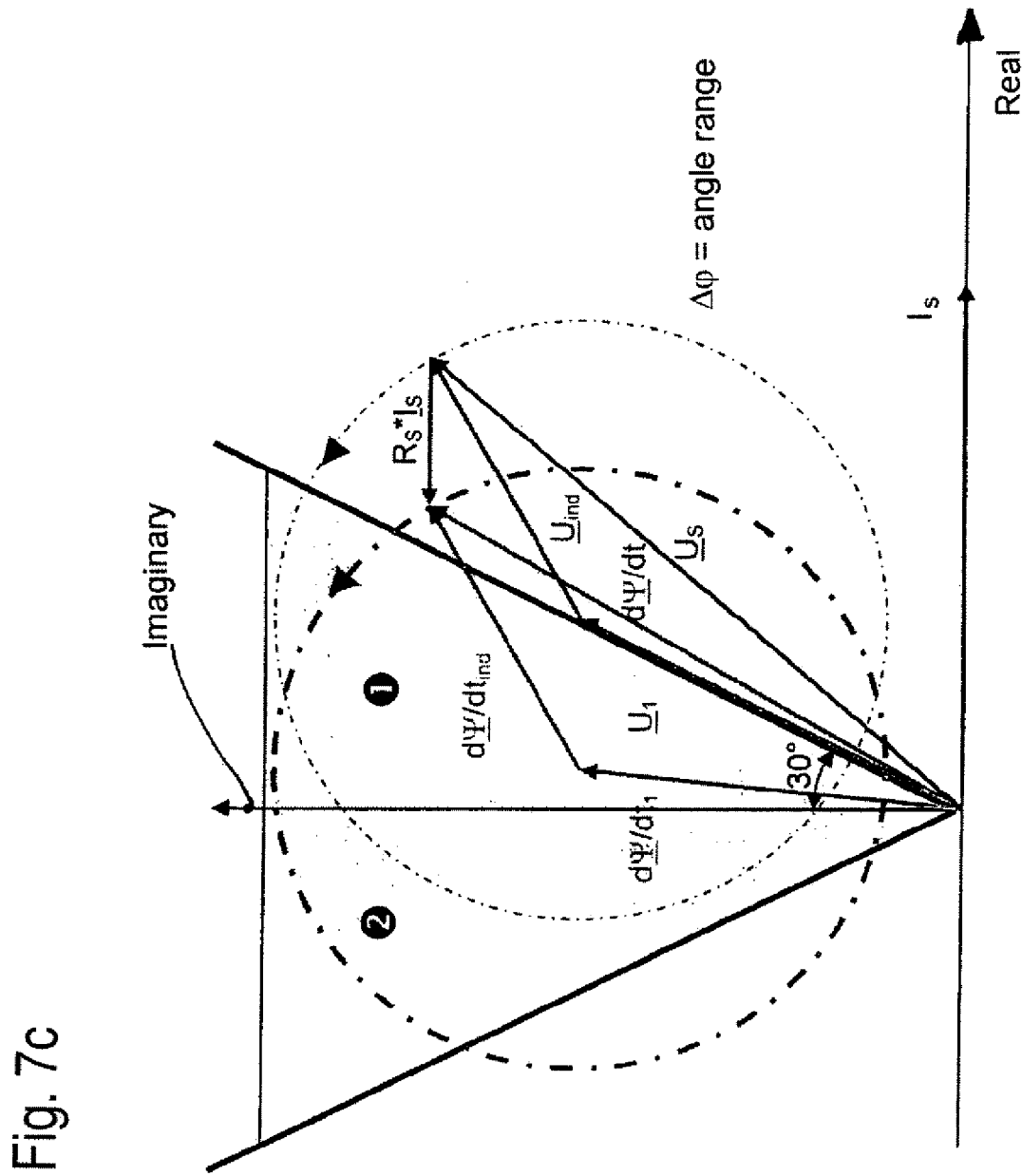

The function 52 in FIG. 7b will be described with reference to FIG. 7c representing a logic design diagram with which the oscillation in the difference signal can be determined, which oscillation is used for the anticipatory control in FIG. 8.

The basic starting point to be adopted is a markedly lower amplitude of the induced voltage in comparison with the main component of the stator voltage $u_i$. The direction of rotation and frequency are to be ascertained.

For that purpose, firstly an angle range $\Delta\phi$ is defined, in which the difference angle was intended to remain after transient response of the current regulator 50. In the example the angle range can be selected around 90°, that is to say can be 60° absolute, or ±30° around 90°, as shown in FIG. 7c. If the difference angle comes out of that defined band, it can come out of one or other of the illustrated areas (1) or (2). A moment in time $t_1$ of the entry/exit into/out of the area (1) or into/out of the area (2) is detected. With the time $t_1$, the longitudinal component $d_{r1}$ and the transverse component $q_{r1}$ of the flux change vector are also established. Also established is the entered/left region (1) or region (2). With those values which can be established by a procedural control system, it is possible to arrive at the frequency if at least one complete rotation of the induced component $U_{ind}$ was effected.

That symbolic circumscription is afforded for FIG. 7b as input parameters $t_1$ (moment in time), $d_{r1}$ (longitudinal component), $q_{r1}$ (transverse component) and the entered/left region (1) or (2). Besides the defined angle range those values are involved in the function 52 and—after at least one complete rotation of the induced component $U_{ind}$—that gives the frequency value to be added, which is added to the output value $\omega$ of the regulator in the anticipatory control in FIG. 8 after the regulator 50 (for the angle difference), in particular by addition thereto.

The direction of rotation was afforded on the basis of the longitudinal component and the transverse component upon entry/exit into/from the respective one of the regions (1) or (2).

The invention claimed is:

1. A method of connecting a control unit as inverter or converter to an asynchronous machine operated without encoder, the asynchronous machine having stator windings and being rotatable at a mechanical rotary speed, wherein the asynchronous machine is regulated by the control unit, the method comprising:
   (a) determining a stator current vector from measured currents of the stator windings of the asynchronous machine and a stator voltage vector;
   (b) calculating a stator flux change vector from the stator current vector, the stator voltage vector and a stator resistance in accordance with a machine model;
   (c) calculating an angle difference between the stator current vector and the stator flux change vector;
   (d) regulating the calculated angle difference to a reference value of +90° or −90°, wherein an output signal of an associated regulator corresponds to a rotary field frequency of the stator voltage vector; and
   (e) regulating an amplitude of the stator voltage vector by way of a current regulator an input thereof being provided with a difference between a current reference value and a value corresponding to the amplitude of the stator current as a regulating difference.

2. The method of claim 1, wherein a reference value of the associated regulator in the form of an angle difference regulator is predetermined in dependence on the direction of rotation of a stator rotary field frequency to 90° or −90°, wherein switching-over with a hysteresis is implemented in particular in the region of a stator rotary field frequency of zero.

3. The method of claim 1, wherein input parameters from the measured currents or from estimated currents, voltages and fluxes or derivatives thereof are predetermined for the associated regulator for angle difference regulation to ascertain a value for the rotary field frequency of the stator or the voltage frequency of the stator.

4. The method of claim 1, wherein a stator flux change vector is formed with the machine model or by way of an estimate from transformed or untransformed parameters of the stator current vector and stator voltage vector.

5. The method of claim 1, wherein a difference angle between the stator current vector and a voltage drop across stator inductances or a change vector of the flux is formed by the machine model or an estimate and said difference angle is used as a value for a controlled or regulated change in the rotary field frequency.

6. The method of claim 1, wherein a current regulator is designed and operates in field-oriented form and a setting value of the q-regulator of the current regulator is used as a correction signal in regulation of the angle difference or in other regions of the connection method.

7. The method of claim 1, wherein connection of the control unit to the asynchronous machine is effected at a different frequency in respect of the machine and the control unit.

8. The method of claim 7 wherein the asynchronous machine rotates at a mechanical rotary speed which is not known to the control unit.

9. The method of claim 1, wherein the asynchronous machine rotates at a mechanical rotary speed which is not known to the control unit.

10. The method of claim 1, wherein the stator current vector is ascertained from measured currents of the stator windings of the asynchronous machine and the impressed stator voltage vector and having regard to an inverter error or an inverter error characteristic.

11. The method of claim 1, wherein the stator flux change vector is calculated in accordance with the machine model and the following equation:

$$\underline{U}_s = R_s \underline{i}_s + \frac{d}{dt}\underline{\Psi}_s.$$

12. The method of claim 1, wherein the amount of the angle difference is regulated.

13. The method of claim 12, wherein regulation of the angle difference is effected in transformed or untransformed form.

14. The method of claim 1, wherein regulation of the angle difference is effected in transformed or untransformed form.

15. The method of claim 1, wherein a remanence of the asynchronous machine is used by the regulator for the angle difference, insofar as the frequency of a voltage is detected as a torque corresponding to an actual slip frequency of the asynchronous machine.

16. The method of claim 1, wherein anticipatory control of the regulator is effected for the angle difference insofar as a frequency of an induced voltage at least initially at least co-determines the output signal of the regulator.

17. The method of claim 16, wherein the induced voltage has a slip frequency and permanently co-determines the output signal of the regulator for the angle difference.

18. The method of claim 1, wherein connection is connection of the control unit to the asynchronous machine.

19. The method of claim 1, wherein the mechanical rotary speed of the asynchronous machine is substantially zero.

20. The method of claim 1, comprising presetting or impressing of the vector, rotating at a first speed, of the stator voltage for ascertaining the stator current vector from the measured currents of the stator windings and the stator voltage vector.

21. The method of claim 1, wherein the stator voltage vector is impressed as a vector, rotating at a first speed, of a stator voltage.

22. The method of claim 1, wherein the stator voltage vector is an impressed vector, at least at the beginning.

23. The method of claim 1, wherein the stator voltage vector is impressed or predetermined at the beginning.

24. The method of claim 1, wherein the stator voltage vector is initialised with a start value as a frequency in order to be impressed.

25. An apparatus for connecting or applying a control unit as an inverter or converter to an asynchronous machine operable without a rotary encoder, which is rotatable at a mechanical rotary speed, wherein the asynchronous machine is regulatable by the control unit, comprising;
  (a) a device for determining a stator current vector from measured currents of the stator windings of the asynchronous machine and a stator voltage vector rotating at a frequency;
  (b) a device with a machine model for calculating a stator flux change vector from the stator current vector, the stator voltage vector and a stator resistance;
  (c) a device for calculating an angle difference between the stator current vector and the stator flux change vector;
  (d) a first regulator for regulating the calculated angle difference to a reference value of +90° or −90°, wherein an output signal of the first regulator corresponds to a rotary field frequency to be impressed of the voltage vector of the stator of the asynchronous machine; and
  (e) a current regulator for regulating an amplitude of the stator voltage vector, wherein a difference of a current reference value and a signal, which corresponds to an amplitude of the stator current, is fed to the current regulator at the input as a regulating difference.

26. The apparatus of claim 25, wherein the stator voltage vector is an impressed vector, at least at the beginning.

27. The apparatus of claim 25, wherein the stator voltage vector is impressed or predetermined at the beginning.

28. The apparatus of claim 25, wherein the stator voltage vector is initialised with a start value as a frequency in order to be impressed.

29. A method of connecting or applying a control unit, as inverter or converter, to an asynchronous machine operated without encoder, which is rotatable at a mechanical rotary speed, wherein the asynchronous machine is regulated by the control unit, comprising:
  (a) determining a stator current vector from measured currents of the stator windings of the asynchronous machine and the impressed stator voltage vector;
  (b) calculating a stator flux change vector from the stator current vector, the stator voltage vector and a stator resistance in accordance with a machine model;
  (c) calculating an angle difference between the stator current vector and the stator flux change vector;
  (d) regulating the calculated angle difference to a reference value of +90° or −90°, wherein an output signal of the regulator corresponds to a rotary field frequency to be impressed of the voltage vector of the stator; and
  (e) regulating an amplitude of the stator voltage vector by way of a current regulator to which at the input the difference from a current reference value and a value corresponding to the amplitude of the stator current is made available, as the regulating difference.

* * * * *